United States Patent [19]

Stout

[11] Patent Number: 5,068,847

[45] Date of Patent: Nov. 26, 1991

[54] FIBER OPTIC NETWORK ARCHITECTURE HAVING DATA FEEDBACK FOR MONITORING COMMUNICATIONS THEREON

[75] Inventor: James C. Stout, Phoenix, Ariz.

[73] Assignee: Honeywell, Inc., Minneapolis, Minn.

[21] Appl. No.: 423,906

[22] Filed: Oct. 19, 1989

[51] Int. Cl.⁵ ............................................ H04J 14/00
[52] U.S. Cl. .................................................... 359/118
[58] Field of Search ............... 455/606, 607, 601, 612, 455/617, 618, 619; 370/1; 350/96.16, 96.15

[56] References Cited

U.S. PATENT DOCUMENTS 4,730,888  3/1988  Darcie ................................. 455/612

FOREIGN PATENT DOCUMENTS 0004341  1/1984  Japan ................................... 455/601
1145487  3/1985  U.S.S.R. .............................. 455/601

OTHER PUBLICATIONS

Petersen et al., "A 90 MHz Fiber Optic Repeater with Regeneration and Remote Control", IEEE National Telecommunications Conference, Nov.-Dec. 1981 pp. A1.4.1-A1.4.5.

Primary Examiner—Curtis Kuntz
Assistant Examiner—L. Pascal
Attorney, Agent, or Firm—A. A. Sapelli; R. W. Jensen; A. Medved

[57] ABSTRACT

A non-autonomous fiber optic network having the capability of monitoring optical data communications of said fiber optic network comprises an optical fiber cable which provides an optical medium (i.e., bus) for communicating optical signals. A bus controller controls the communications of optical information on the optical fiber cable. The bus controller also monitors the optical information outputted on the optical fiber cable, thereby verifying the integrity of the optical information transmitted to terminals connected to the optical fiber cable. An optical interface of the bus controller taps a percentage of power that is outputted onto the optical fiber bus and routes that signal to a receiver unit of the bus controller. The signal coupled back to the receiver unit is utilized by the bus controller to monitor the integrity of the transmitted data that is outputted on the optical fiber bus.

2 Claims, 3 Drawing Sheets

FIBER OPTIC NETWORK ARCHITECTURE HAVING DATA FEEDBACK FOR MONITORING COMMUNICATIONS THEREON

RELATED PATENT APPLICATION

The present patent application is related to U.S. patent application, Ser. No. 07/423,901, now U.S. Pat. No. ————, entitled "FIBER OPTIC REFLECTIVE TREE ARCHITECTURE" by J. C. Stout, filed on even date herewith, an assigned to Honeywell Inc., the assignee of the present application.

BACKGROUND OF THE INVENTION

This invention relates to data transmission networks, and more particularly, to a fiber optic network having data feedback.

In an autonomous network every terminal is capable of hearing the information or data transmission of any other terminal in the network to determine when the bus is idle. For this type of network (i.e., autonomous network) the architecture inherently provides signal feedback so that each terminal hears its own transmissions. Thus, in autonomous networks, or in any network in which the architecture provides a wrap-around of data output on the bus back to the transmitting terminal's receiver (i.e., star, linear bus . . . ), no additional feedback apparatus is necessary to monitor the integrity of the data outputted onto the bus.

The present invention finds particular application in a non-autonomous fiber optic data network, and may be applied directly to aircraft flight controls.

Optical data transfer is a relatively new technology that is replacing copper wire data buses in some application areas. A simple tee connection can be utilized in a copper wire data bus to provide feedback of the data output from a terminal connected to the data bus. This is not physically possible in a fiber optic network because of the directional nature of light.

System wrap-around techniques have been utilized to monitor the integrity of data on an optical bus. With this technique, data output from a controlling terminal is received by slave terminals and decoded. A message indicating the integrity of the received signal is then transmitted back to the master terminal by at least one slave terminal. The system wrap-around technique results in relatively high system complexity in that many active components are required to implement this monitoring technique. The system wrap-around technique results in high bandwidth requirements on the fiber optic bus because information regarding the integrity of the received signal must be transmitted from one or more slave terminals back to the controller.

Thus there is a need for monitoring the integrity of optical data output onto a fiber optic data bus from a controlling terminal while minimizing the complexity of the monitoring scheme. The present invention provides a fundamentally different scheme for monitoring the data on the optical bus then heretofore mentioned.

The present invention uses passive optical couplers to tap off a percentage of the optical power, which is routed to the terminal's receiver. This implementation, therefore, requires no active components outside of the enclosure of the terminal to monitor the data bus. Further, the bus in the present invention is being monitored at the terminal's output rather than at the opposite end of the data bus, thus providing very reliable information of the data being output onto the bus by the terminal being monitored. Increased bandwidth requirements are not imposed on the bus to implement the monitoring technique because the slave terminals are not required to transmit back any information for the monitoring technique of the present invention to be realized.

SUMMARY OF THE INVENTION

Therefore, there is provided by the present invention, a communication network which includes an apparatus for communicating on a fiber optic bus of a fiber optic data network, the apparatus including monitoring the integrity of data outputted onto the bus. A non-autonomous fiber optic network having the capability of monitoring data communications of said fiber optic network comprises an optical fiber cable which provides an optical medium (i.e., bus) for communicating optical signals. A bus controller controls the communications of optical information on the optical fiber cable. The bus controller also monitors the optical information outputted on the optical fiber cable, thereby verifying the integrity of the optical information transmitted to terminals connected to the optical fiber cable.

An optical interface of the bus controller taps a percentage of power that is outputted onto the optical fiber bus and routes that signal to a receiver unit of the bus controller. That signal is utilized by the bus controller to monitor the integrity of the transmitted data that is outputted on the optical fiber bus.

Accordingly, it is an object of the present invention to provide a network having an apparatus for communicating on a fiber optic bus of a fiber optic network.

It is another object of the present invention to provide a network having an apparatus for communicating on a fiber optic bus of a fiber optic network wherein the information communicated onto the bus is monitored.

These and other objects of the present invention will become more apparent when taken in conjunction with the following description and attached drawings, wherein like characters indicate like parts, and which drawings form a part of the present application.

DETAILED DESCRIPTION

Figure 1:
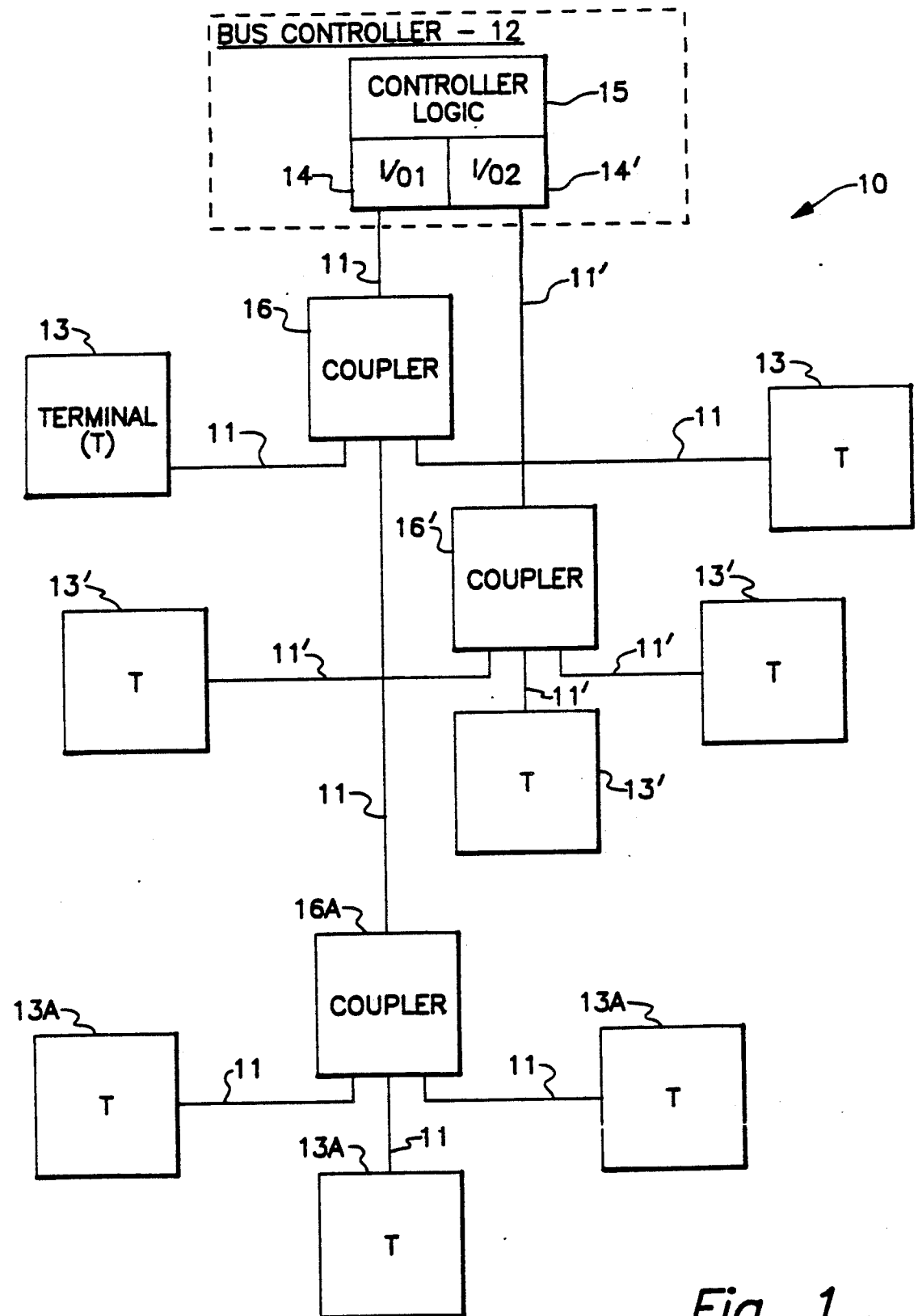
FIG. 1 shows a schematic drawing of a dual-tree architecture of a fiber optic network of the preferred embodiment of the present invention.

Referring to FIG. 1, there is shown a schematic drawing of a dual-tree architecture of a fiber optic network of the preferred embodiment of the present invention. The fiber optic network 10 includes a first fiber optic cable 11 and a second fiber optic cable 11' each cable forming a bidirectional fiber optic data bus. A centralized bus controller (or bus master) 12 is connected to both the first and second fiber optic cable 11, 11', via an input/output unit, I/01 and I/02, 14 and 14' respectively, the bus controller 12 also including controller logic 15. The bus controller 12 is a master terminal connected to the fiber optic cables 11, 11' which communicates (receives and transmits) to other terminals (T) 13 connected to the extension of the fiber optic cables 11, 11' described below, the terminals (T) 13 being slave terminals. The fiber optic cables 11, 11' are connected to a corresponding coupler 16, 16'. Each coupler then has n branches, in the preferred embodiment n=3, i.e., a 1×3 directional star coupler was utilized. Each terminal 13 receives or transmits to the bus controller 12. I/O units 14, 14' comprise the optical interface of the bus controller 12. The controller logic 15 of the bus controller 12 performs the control function according to a predetermined protocol well known to those skilled in the art and will not be discussed further herein since it is not necessary for an understanding of the present invention.

Figure 2:
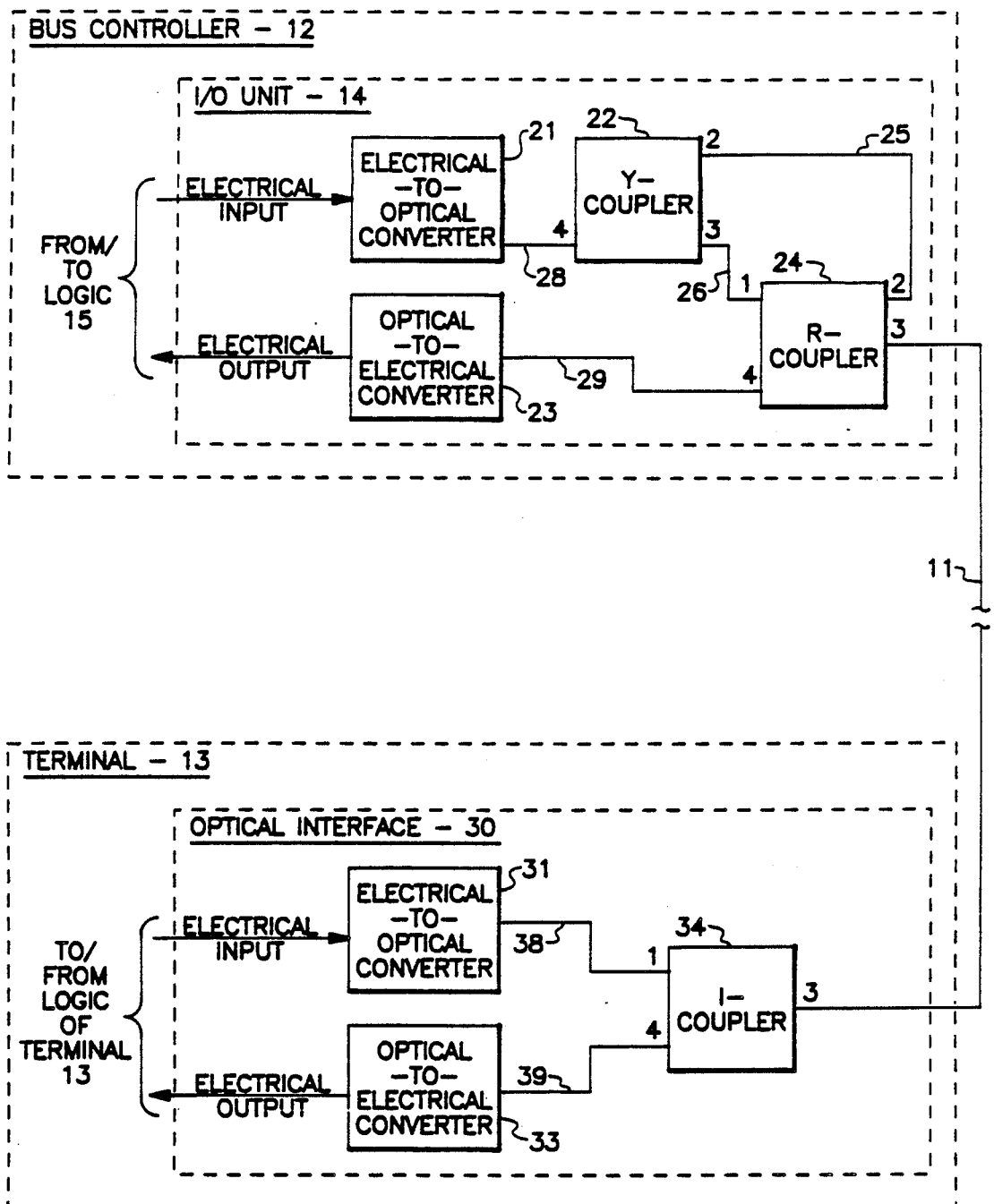
FIG. 2 shows a functional block diagram of an optical interface unit utilized in the fiber optic network of FIG. 1.

Referring to FIG. 2, there is shown a functional block diagram of the I/O unit 14 and an optical interface 30 of terminal 13. Each I/O unit 14, 14' forms the optical interface between the electrical signals of controller logic 15 and the optical signals of the fiber optic cable 11, 11', respectively. Electrical signals from the logic 15 of bus controller 12 are inputted to an electrical-to-optical converter (transmitter) 21, the output of transmitter 21 being an optical power signal which is coupled by a fiber 28 to port 4 of transmitter coupler (Y-coupler) 22. (Note that the port numbers are indicated around the periphery of the block.) In the preferred embodiment of the present invention the Y-coupler 22 is a 1×2 directional coupler. Directional couplers currently available deliver nearly 100% of the power from port 4 of the Y-coupler 22 to ports 2 and 3 (of the Y-coupler 22), and have split ratios of power output (i.e., the ratio of power output to port 2 compared with the power output to port 3). The split ratio for the Y-coupler 22 of the preferred embodiment of the present invention is chosen such that the power loss from the transmitter 21 to an optical-to-electrical converter (receiver) 23 via a wrap-around loop 25 is approximately equal to the loss from transmitter 21 to an optical-to-electrical converter 33 of the optical interface 30 of the terminal 13.

Power outputted to port 3 of Y-coupler 22 is coupled to port 1 of receiver coupler (R-coupler) 24, in the preferred embodiment the R-coupler 24 being a 2×2 directional coupler. Power which is outputted from port 2 of Y-coupler 22 is coupled via the wrap-around loop 25 to port 2 of R-coupler 24. Fifty percent (50%) of the power inputted to port 1 of R-coupler 24 is outputted to port 3 of R-coupler 24 and launched onto the bidirectional fiber optic bus 11. Fifty percent (50%) of the power inputted to port 2 of R-coupler 24 is outputted at port 4 of R-coupler 4. (There is some loss of about 1 db in the coupler which has not been considered in order to emphasize the description of the operation of the apparatus.)

The power outputted at port 4 of the R-coupler 24 is coupled, via fiber optic cable 29, to the receiver 23, thereby permitting the bus controller 12 to monitor the data outputted by its transmitter 21. The power outputted from the transmitter 21 which is not coupled to the cable 11, or to the receiver 23 is not used and does not interfere or enhance the performance of the network 10.

A data signal launched onto the bus 11 from an electrical-to-optical converter (transmitter) 31 of a terminal 13, is coupled from the bus 11 to port 3 of the R-coupler 24. Fifty percent (50%) of the power inputted to port 3 of the R-coupler 24 (less excess loss) is outputted at port 4 of R-coupler 24, and is coupled via fiber optic cable 29, to the receiver 23 for processing by the bus controller 12.

As can be readily seen from the above discussion, the preferred embodiment of the present invention utilizes standard, commercially available directional couplers, and can be implemented in single mode or multimode systems. In the preferred embodiment of the present invention, only a 1 to 3 db additional loss was experienced in providing the monitoring capability of the present invention, the exact loss being dependent on the splitting ratio of the Y-coupler 22.

Figure 3:
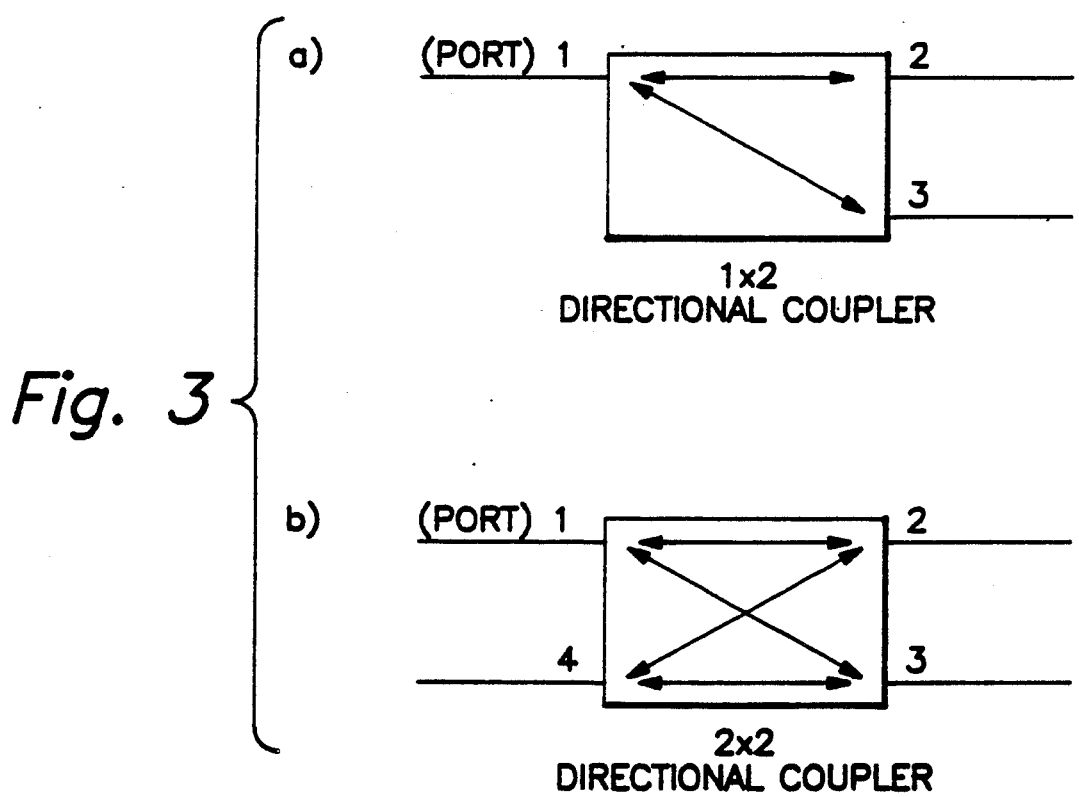
FIG. 3 shows a functional block drawing of the directional couplers utilized in the preferred embodiment of the present invention.

Referring to FIG. 3, there is shown a functional block drawing of the directional couplers utilized in the preferred embodiment of the present invention, indicating transmission paths and directions of the transmissions between ports. Optic power input at port 1 of the 2×2 directional coupler is output to ports 2 and 3. The splitting ratio is the power output to port 2 divided by that which is output to port 3. When power is input at port 2, the same splitting ratio is observed at output ports 1 and 4 as exists between ports 2 and 3 with input at port 1. The port directly across from the input port is the favored port, receiving at least 50% of the input power. The other output port is the tap port. This observation demonstrates the symmetrical nature of directional couplers. Couplers also demonstrate the property of reciprocity, i.e., the loss between any two ports is independent of the direction of travel of the optic power signal. The loss from port 1 to port 3 is the same as the loss from port 3 to 1.

It will be recognized by those skilled in the art that a dual tree network is not necessary to implement the present invention, and likewise, the tree architecture can be expanded to include triple, quadruple , . . . tree architectures within the spirit of the present invention. The 1×3 star couplers utilized in the present invention are commercially available, the coupler used in the preferred embodiment of the present invention is Kaptron C88-7019-26-1. Further, the 1×2 directional coupler and the 2×2 directional coupler used in the preferred embodiment of the present invention are also commercially available.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A fiber optic network having the capability of monitoring data communications of said fiber optic network, said fiber optic network comprising:
   a) optical bus means for providing an optical medium to communicate optical signals;
   b) bus controller means, operatively connected to said optical bus means, for controlling communications of optical information on said optical bus means, to monitor said optical information outputted on the optical bus means, thereby verifying the integrity of said optical information, and wherein said bus controller means includes,
      1) controller logic means for performing the controller function in accordance with predetermined protocol requirements; and
      2) optical interface means, for interfacing electrical signals of said controller logic means and optical signals of said optical bus means to provide a conversion therebetween thereby providing compatible communications between said bus controller means and said optical bus means, and further wherein said optical interface means monitors the optical information launched onto the optical bus means by said bus controller means thereby verifying the integrity of said optical information, and wherein said optical interface means includes, i) first converter means for converting said electrical signals from said controller logic means to a first optical output signal, the first optical output signals having a power associated therewith;

ii) second converter means for converting an optical input signal to an electrical output signal, said electrical output signal being coupled to said controller logic means;

iii) first coupler means having a first and second output terminal, said first coupler means operatively connected to said first converter means, for coupling the first optical output signal to the first and second output terminals of said first coupler means, the power of the signal being delivered to the first and second output terminals of said first coupler means having a predetermined split ratio power output, such that the first output terminal outputs a second optical output signal and the second output terminal outputs a third optical output signal, the second and third optical output signals having power associated therewith corresponding to the split ratio of the first coupler means; and iv) second coupler means having a first, second, third, and fourth terminal, the first and second output terminal of said first coupler means operatively connected to said second and first terminal of said second coupler means, respectively, the third terminal of said second coupler means operatively connected to said optical bus means, and the fourth terminal of said second coupler means operatively connected to said second converter means, for coupling said third and second optical output signals to the third and fourth terminal of said second coupler means, respectively, to output the first predetermined portion of the first optical output signal onto the optical bus means and to couple a second predetermined portion of the first optical output signal back to the controller logic means, thereby permitting the bus controller means to communicate with the terminal means coupled to the optical bus means, and providing the information communicated onto the optical bus means to the controller logical means for monitoring; and c) at least one terminal means, operatively connected to said optical bus means, for communicating with said bus controller means.

2. A fiber optic network having the capability of monitoring data communications of said fiber optic network, said fiber optic network comprising:

a) a plurality of optical bus means for providing an optical medium to communicate optical signals;

b) bus controller means, operatively connected to said plurality of optical bus means, for controlling communications of optical information on each of said optical bus means, to monitor said optical information outputted on each of the optical bus means, thereby verifying the integrity of said optical information thereon, and wherein said bus controller means includes, 1) controller logic means for performing the controller function in accordance with predetermined protocol requirements; and 2) a plurality of optical interface means, for interfacing electrical signals of said controller logic means and optical signals of said corresponding optical bus means to provide a conversion therebetween thereby providing compatible communications between said bus controller means and said corresponding optical bus means, and further wherein each of said optical interface means monitors the optical information launched onto the corresponding optical bus means by said bus controller means thereby verifying the integrity of said optical information, and wherein each of said optical interface means includes, i) first converter means for converting said electrical signals from said controller logic means to a first optical output signal, the first optical output signal having a power associated therewith;

ii) second converter means for converting an optical input signal to an electrical output signal, said electrical output signal being coupled to said controller logic means;

iii) first coupler means having a first and second output terminal, said first coupler means operatively connected to said first converter means, for coupling the first optical output signal to the first and second output terminals of said first coupler means, the power of the signal being delivered to the first and second output terminals of said first coupler means having a predetermined split ratio power output, such that the first output terminal outputs a second optical output signal and the second output terminal outputs a third optical output signal, the second and third optical output signals having power associated therewith corresponding to the split ratio of the first coupler means; and iv) second coupler means having a first, second, third, and fourth terminal, the first and second output terminal of said first coupler means operatively connected to said second and first terminal of said second coupler means, respectively, the third terminal of said second coupler means operatively connected to said corresponding optical bus means, and the fourth terminal of said second coupler means operatively connected to said second converter means, for coupling said third and second optical output signals to the third and fourth terminal of said second coupler means, respectively, to output a first predetermined portion of the first optical output signal onto the corresponding optical bus means and to couple a second predetermined portion of the first optical output signal back to the controller logic means, thereby permitting the bus controller means to communicate with the terminal means via a predetermined optical interface means coupled to the corresponding optical bus means, and providing the information communicated onto the corresponding optical bus means to the controller logic means for monitoring; and c) a plurality of terminal means, each terminal means operatively connected to a predetermined optical bus means, for communicating with said bus controller means.

* * * * *